United States Patent
Shi

(10) Patent No.: US 7,868,930 B2
(45) Date of Patent: Jan. 11, 2011

(54) METHOD AND APPARATUS FOR AUTOMATIC WHITE BALANCE

(75) Inventor: Ge Shi, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 536 days.

(21) Appl. No.: 12/037,835

(22) Filed: Feb. 26, 2008

(65) Prior Publication Data

US 2008/0143846 A1 Jun. 19, 2008

Related U.S. Application Data

(62) Division of application No. 10/813,635, filed on Mar. 30, 2004, now Pat. No. 7,423,779.

(51) Int. Cl.
*H04N 9/73* (2006.01)
*H04N 9/70* (2006.01)

(52) U.S. Cl. ................... 348/223.1; 348/225.1

(58) Field of Classification Search .......... 348/223.1, 348/225.1

See application file for complete search history.

(56) References Cited

U.S. PATENT DOCUMENTS

| | | | |
|---|---|---|---|
| 5,198,890 A * | 3/1993 | Suga | 348/227.1 |
| 6,069,972 A | 5/2000 | Durg et al. | |
| 6,072,526 A * | 6/2000 | Hashimoto et al. | 348/223.1 |
| 6,249,317 B1 * | 6/2001 | Hashimoto et al. | 348/364 |
| 6,870,567 B2 | 3/2005 | Funston et al. | |
| 6,952,225 B1 | 10/2005 | Hyodo et al. | |
| 7,162,078 B2 | 1/2007 | Cheng | |
| 7,359,548 B2 * | 4/2008 | Douglass et al. | 382/162 |
| 7,423,779 B2 | 9/2008 | Shi | |
| 7,463,287 B2 * | 12/2008 | Aotsuka | 348/223.1 |
| 7,643,068 B2 * | 1/2010 | Hyodo | 348/223.1 |
| 2001/0024234 A1 | 9/2001 | Kubo | |
| 2001/0030694 A1 | 10/2001 | Abe | |
| 2002/0106206 A1 | 8/2002 | Takeshita | |
| 2003/0052978 A1 | 3/2003 | Kehtarnavaz et al. | |
| 2004/0179113 A1 * | 9/2004 | Suzuki | 348/223.1 |
| 2004/0189821 A1 | 9/2004 | Oda et al. | |
| 2005/0185065 A1 | 8/2005 | Goris et al. | |

(Continued)

FOREIGN PATENT DOCUMENTS

EP 0 530 738 A 3/1993

(Continued)

OTHER PUBLICATIONS

U.S. Notice of Allowance mailed Jan. 25, 2008, U.S. Appl. No. 10/813,635, filed Mar. 30, 2004 (8 pages).

(Continued)

*Primary Examiner*—Sinh Tran
*Assistant Examiner*—Hung H Lam
(74) *Attorney, Agent, or Firm*—Blakely Sokoloff Taylor & Zafman LLP

(57) ABSTRACT

A method of automatic white balance for an image capture system is disclosed. The automatic white balance mechanism ascertains the illuminant source of an image by analyzing the number of white pixels within a predefined white area in a color space diagram. The automatic white balance mechanism also determines gain adjustments based on the evaluating the average RGB values to achieve white balance.

2 Claims, 5 Drawing Sheets

U.S. PATENT DOCUMENTS

2006/0192888 A1    8/2006    Milkov et al.

FOREIGN PATENT DOCUMENTS

EP    1585345 A3    5/2008
JP    2000 224608 A    8/2000

OTHER PUBLICATIONS

U.S. Notice of Allowance mailed Jul. 8, 2008, U.S. Appl. No. 10/813,635, filed Mar. 30, 2004 (8 pages).
U.S. Office Action mailed Jun. 17, 2010, U.S. Appl. No. 12/037,841, filed Feb. 26, 2008 (14 pages).
U.S. Office Action mailed Jul. 9, 2010, U.S. Appl. No. 12/037,844, filed Feb. 26, 2008 (8 pages).
U.S. Office Action mailed Jul. 12, 2010, U.S. Appl. No. 12/037,846, filed Feb. 26, 2008 (8 pages).
U.S. Office Action mailed Jun. 23, 2010, U.S. Appl. No. 12/037,855, filed Feb. 26, 2008 (11 pages).
Notice of Allowance mailed Oct. 8, 2010, U.S. Appl. No. 12/037,849, filed Feb. 26, 2008 (17 pages).

* cited by examiner

METHOD AND APPARATUS FOR AUTOMATIC WHITE BALANCE

CROSS-REFERENCE TO RELATED APPLICATIONS

This application is a divisional of U.S. patent application Ser. No. 10/813,635, filed 30 Mar. 2004, and claims priority therefrom under the provisions of 35 U.S.C. §120. The priority application is currently pending.

TECHNICAL FIELD

The present invention relates to an automatic white balance mechanism in an image capture system. The system employs an automatic white balance algorithm that determines the illuminant source of the image and adjusts the gain on each color channel to obtain equivalent red (R), green (G), and blue (B) values. When the RGB values are equivalent and white balance is achieved, a white object in an image will appear white even under different illuminant sources.

BACKGROUND

The human visual system adapts to changing illuminant sources by ensuring that a white object appears white. When a white object travels from daylight, which has more blue color component, to incandescent light, which has more red color component, the human visual system makes adjustment to balance the red, green, and blue color components to ensure that a white object appears white in both daylight and incandescent light. The technique of balancing the red color, green color, and blue color components is known as white balance. Thus, the human visual system automatically white balances an image to preserve the true white color of a white object in the image as the object travels under different illuminant types. Image capture systems use automatic white balance algorithms to mimic the human visual mechanism in order to reproduce the true white color of a white object in an image under different illuminant sources.

The strength of the RGB color components varies significantly in different light conditions. There is far more blue color component in daylight than in interior cool white fluorescent (CWF) light. Table 1 provides a color temperature index for different illuminant types. Higher color temperature, such as daylight, has more blue color component while lower color temperature, such as incandescent light, has more red color component.

TABLE 1

Color Temperature Index

| Illuminant Type | Color Temperature |
| --- | --- |
| Daylight | 5000-7500 K |
| Cool White Fluorescent | 4500 K |
| U30 (General Office Light) | 3000 K |
| A (Incandescent Light) | 2000 K |

Prior art automatic white balance methods assume that the whole image needs to be white balanced. This assumption causes the over inclusion of RGB values of all pixels of an image in calculating the average RGB values. The average RGB values are used to adjust color gains in a captured image. In other words, the amount of color gain to apply to each color channel is based on making the red, green, and blue color components equal to the average RGB values. When RGB values of all pixels are included in calculating the average RGB values, undesirable influence from strong colors will also be incorporated. When a strong color object enters or leaves a scene, its influence will skew the average RGB values. A strong color contribution in the average RGB calculation can ultimately cause an object to lose its true color. For example, when a red object enters a scene with a red background, this image will have a predominant red color value. The red color will heavily influence the average RGB values of this image. The red color contribution in the average RGB values is so strong that the affect on the gain adjustment can cause an object to lose its true color.

Another prior art method of automatic white balancing defines a single white area in a color space diagram for all illuminant types in an attempt to combat strong color influences. This method uses a color space diagram to identify the white pixels of an image. The white area in a color space diagram serves as a template for detecting the white pixels of an image. If a pixel has a value falling within the white area then it is determined to be a white pixel and its RGB values will be used to calculate the average RGB values for color gain adjustments.

A drawback of using a color space diagram with a single white area is the possibility of incorrectly including non-white pixels in calculating the average RGB value. In some instance, a strong color pixel has similar attribute as a white pixel and can fall within the white area of a color space diagram. The non-white pixels can have a negative effect on the RGB averaging calculation. For example, strong blue pixels have similar characteristics as white pixels in daylight. When an image contains strong blue pixels, they will incorrectly be construed as white pixels and their RGB values will be included in the RGB averaging calculation. The contribution from the strong blue pixels will result in incorrect average RGB values, which will be used for determining gain adjustments.

Additionally, this method cannot be used to ascertain the illuminant source of the image because a single white area for all illuminant type does not have sufficient information to support further analysis to obtain the identity of the illuminant source.

Thus, there is a need for a robust automatic white balance mechanism that can eliminate strong color influences and has the capability to respond quickly to changes in illuminant source.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Figure 1:
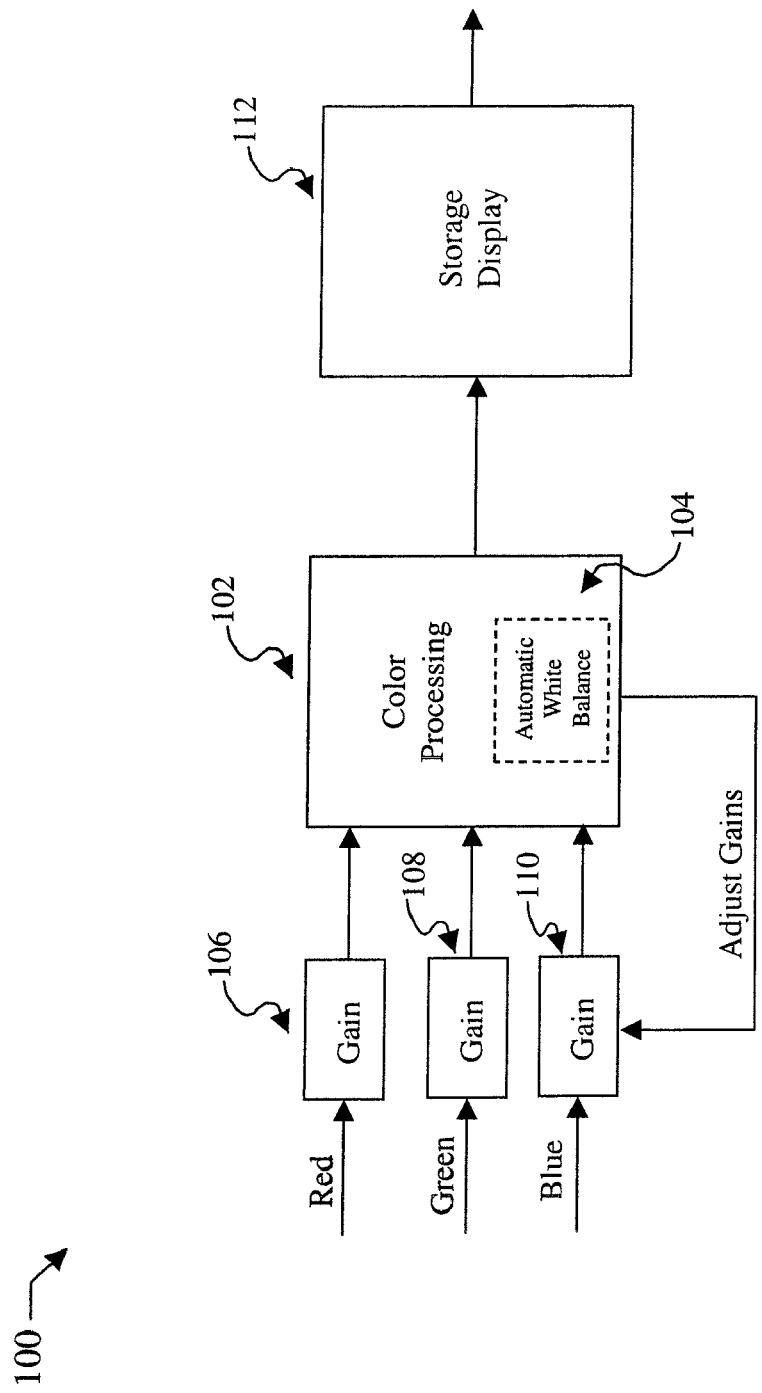
FIG. 1 is a schematic diagram of an image capture system in accordance with the present invention.

In the detailed description provided below, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The automatic white balance (AWB) methodology analyzes a captured image to determine its illuminant source and then, derives the amount of gain adjustment necessary to achieve white balance. The AWB mechanism examines the pixels of an image to obtain information on the illuminant source of the image. It also determines the gain adjustments needed for white balancing the image. The white pixels of an image contain information used to ascertain the white balance setting.

The AWB mechanism uses a color space diagram that contains two or more predefined white areas for different illuminant sources. A predefined white area characterizes the space occupied by the white pixels of an illuminant source in a color space diagram. In other words, the predefined white area is the area in a color space diagram where all white pixels of a particular illuminant source can be found. Therefore, locating the predefined white area of a white pixel will reveal the illuminant source associated with the pixel. A color space diagram with separate predefined white areas for different illuminant sources can serve as a template for ascertaining the illuminant source of white pixels.

The AWB mechanism also relies on the color space diagram to select the white pixels of an image. The RGB values of white pixels are used to decide whether there is a need for gain adjustments to the red, green, and blue channels to white balance an image.

AWB calculates the Green/Red (G/R) ratio and Green/Blue (G/B) ratio of a pixel. AWB plots the G/R and G/B ratios on a color space diagram. The ratios will provide a point in the color space diagram. If the pixel is a white pixel, the point created by the G/R and G/B ratios will fall within one of the predefined white area. This analysis identifies whether the pixel is a white pixel and identifies the predefined white area associated with the white pixel, which in turn provides illuminant source information. An AWB system can implement this analysis by storing the G/R and G/B ratios of each point in a predefined white area in a table or matrix.

When AWB identifies a white pixel of an image, the RGB values of the pixel are stored until all the pixels have been analyzed. After all the RGB values are collected, the AWB mechanism calculates average RGB values for all the white pixels. For efficiency, a selected group of white pixels, such as every third or fourth white pixel, is used for the averaging calculations. Average R value, average G value and average B value are calculated for the white pixels. Then, the AWB mechanism compares the average R value to the average G value and compares the average B value to the average G value to determine the R gain adjustment for the R channel, G gain adjustment for the G channel, and B gain adjustment for B channel for white balancing.

The image sensor of an AWB system continuously captures images sequentially. AWB performs white balancing on each captured image. White balance settings are calculated for the current captured image and applied on the subsequent captured image. The methodology continuously white balances every incoming image to determine whether there is a change in the illuminant source and whether there is a need for gain adjustments.

Now turning to FIG. 1, which illustrates an image capture apparatus of the present invention. Color processing block 102 accepts input pixels serially, such that several lines of an image may be access at one time. The input pixels are manipulated for later image display. Color processing 102 also performs automatic white balancing.

Automatic white balance block 104 evaluates the input pixels to determine the amount of gain adjustment necessary for each color channel to achieve white balance. Under different illuminant sources, the strength of each RGB color will be dramatically different. When the illuminant source is daylight (i.e., the image is captured in daylight) the image will have a greater blue color component influence. Likewise, when the illuminant source is incandescent light there will be a greater red color influence in the image, as oppose to the same image captured under daylight. Automatic white balance is performed to make sure a white object in an image appears white under different illuminant types by determining the gain adjustments, if needed, for the red channel, green channel, and blue channel.

White balancing is attained when the RGB values are equivalent. Gain block 106 adjusts the red color value, if needed, in the red channel for white balancing. Similarly, gain block 108 adjusts the green color value, if needed, in the green channel and gain block 110 adjusts the blue color value, if needed, in the blue channel.

Storage display 112 holds an image until the user wants to view the image or displays the image in real time. For example, a camera system, in real time mode, may not store a whole image but instead serially transmits the pixels of the image to a computer or other display systems.

Figure 2:
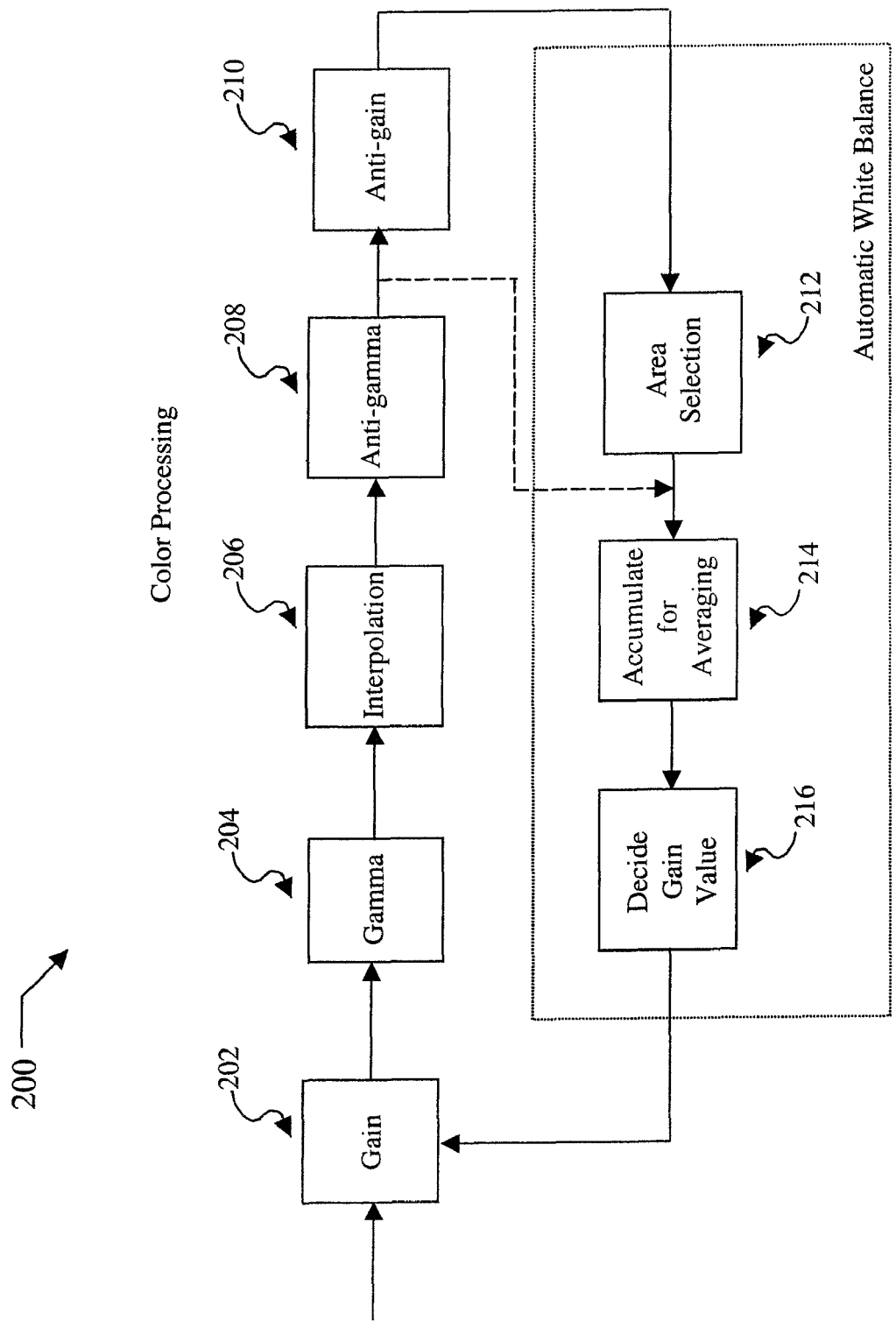
FIG. 2 is a schematic diagram of a color processing system with automatic white balance.

FIG. 2 illustrates one embodiment of a color processing system with automatic white balance for one of the color channels. Gain block 202 applies the associated gain adjustment to the color channel, if needed for white balancing.

Gamma 204 controls the overall brightness as well as accurate color reproduction of an image. If an image is not gamma corrected it can look either bleached out or too dark. The amount of gamma correction affects the brightness of an image and the ratios of red to green to blue. Gamma 204 compensates for the non-linear relationship of pixel value and intensity of a display system before displaying the image.

Color processing module accepts input pixels serially, line by line. A line of pixel input sequence is blue, green, blue, green, etc., and the next line of pixel input sequence is green, red, green, red, etc. The total number of pixels includes alternating lines of blue, green and green, red for the entire image with 50% green, 25% red, and 25% blue. Color interpolation 206 ascertains the two missing color values in each pixel. There are several interpolation techniques, such as nearest neighbor, linear, cubic, and cubic spline. The output of color interpolation 206 is lines of RGB, RGB, RGB, etc.

Gamma correction and analog gain are for the display system. Therefore, if input data to AWB has been gamma corrected and gain adjusted they must be reversed. Gamma function and analog gain may influence the location and profile of white areas. The white point location is calibrated under standard gain setting and non-gamma transfer function. Anti-gamma 208 is used to cancel the effect of gamma correction. Anti-gain 210 is used to cancel the effect of the analog gains applied in the R, G, and B channels.

Area selection block 212 calculates the Green/Red (G/R) ratio and the Green/Blue (G/B) ratio of a pixel. For each pixel, the G/R and G/B ratios create a point to be plotted on a color space diagram. If the point falls within one of the predefined white areas in a color space diagram then the pixel is a white pixel. For example, a white pixel that falls within the daylight predefined white area will have requisite G/R and G/B ratios that are inside the predefined white area for daylight.

A pixel with R=100, G=105, and B=112 will result in G/R=(105/100)*128=134.5 and G/B=(105/112)*128=120. These ratios create a point that falls within the predefined white area of CWF. Thus, the ratios reveal that the pixel is a white pixel. In contrast, if R=225, G=10, and B=10 then G/R=(10/255)*128=5 and G/B=(10/255)*128=5, which would create a point outside of any predefined white area and the pixel could not be a white pixel. If these RGB values are used in calculating the white balance setting, they will skew the true color of the other pixels causing them to be too blue or too green.

When area selection block 212 finishes analyzing all pixels of an image. It then determines the illuminant source of the image by counting the number of white pixel points that are in each of the predefined white areas. The predefined white area with the highest number of white pixel points is indicative of the illuminant source of the image. For example, if the daylight predefined white area contains more white pixel points than the CWF and A/U30 white areas then the illuminant source of the captured image is daylight. If the CWF white area has the highest number of white pixel points then CWF is the illuminant source. Similarly, if A/U30 has the highest number of white pixel points then the illuminant source is incandescent light/general office light.

Accumulate for averaging block 214 stores all the white pixel RGB values until area selection block 212 analyzes all the pixels of an image.

Decide gain value block 216 calculates the average red value, average green value, and average blue value of the white pixels of one, some, or all of the illuminant sources. The decide gain value block 216 uses the red, green, and blue averages to decide whether any color gain adjustment is required for white balancing.

In other embodiments, the color processing system applies the gamma and gain function outside of the AWB control loop. For example, gamma can be performed in the Y channel or gain can be applied after color interpolation. If the gamma and gain functions are located in a different signal path then anti-gamma and anti-gain functions are not needed in the system.

Figure 3:
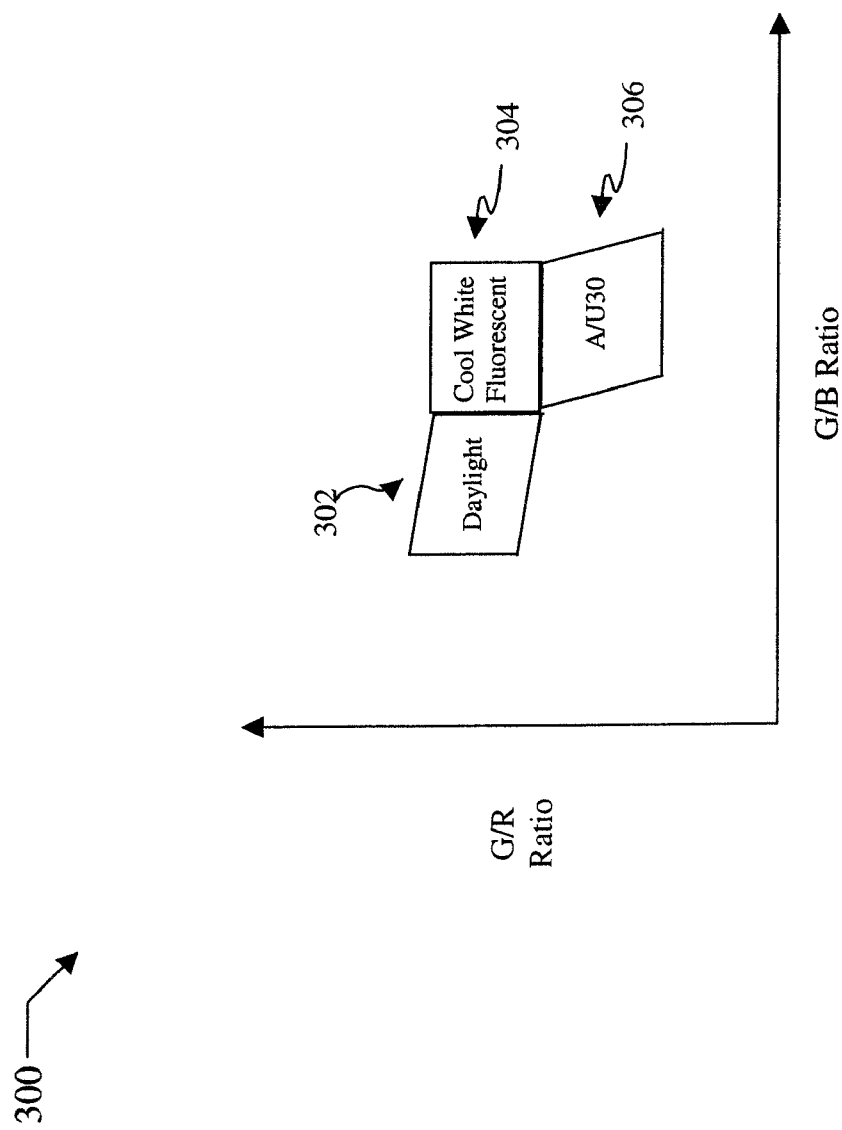
FIG. 3 is an illustration of a color space diagram with different predefined white areas. This color space diagram contains predefined white areas for daylight, CWF, and A/U30 illuminant types in accordance with the present invention.

FIG. 3 illustrates a color space diagram with predefined white areas for daylight 302, CWF 304, and A/U30 306. Although, FIG. 3 illustrates a color space diagram with three predefined white areas, a color space diagram of the present invention can have two or more predefined white areas. Further, FIG. 3 shows a combined predefined white area for illuminant types A (incandescent light) and U30 (general office light). A color space diagram can have separate predefined white area for A and U30, such that each illuminant type having its own predefined white area.

Figure 4:
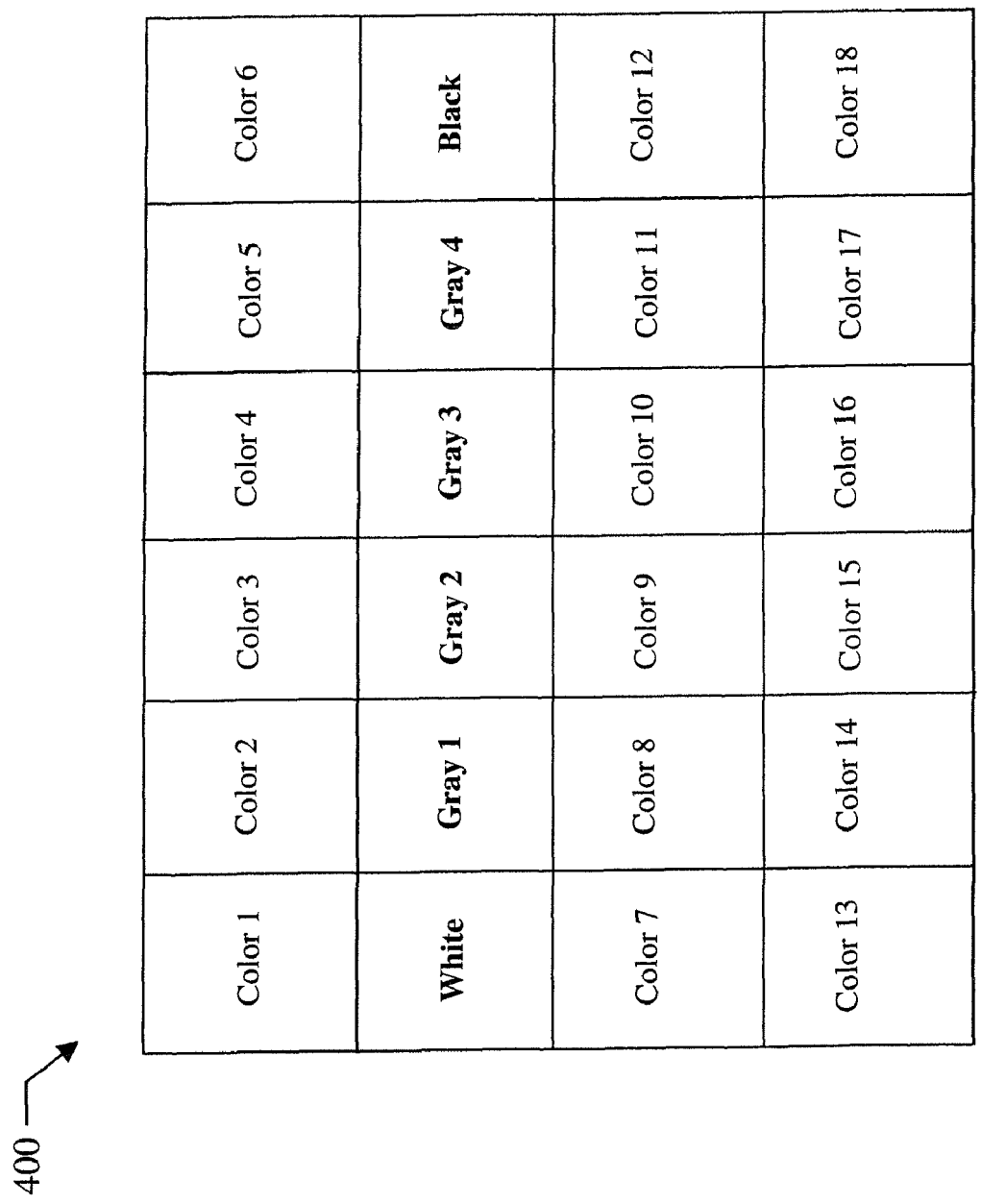
FIG. 4 is a color chart for defining white areas in a color space diagram in accordance with the present invention.

FIG. 4 depicts a color chart containing 24 blocks of different colors. A color chart is used for predefining white areas in a color space diagram for different illuminant sources. A color chart is not limited to 24 color blocks, but rather it can have any number of color blocks necessary for defining white areas, so long as each of the blocks contains a known color, of which six of the blocks are the color white, gray 1, gray 2, gray 3, gray 4, and black. Gray 1 to gray 4 color block contains varying shades of gray.

Figure 5:
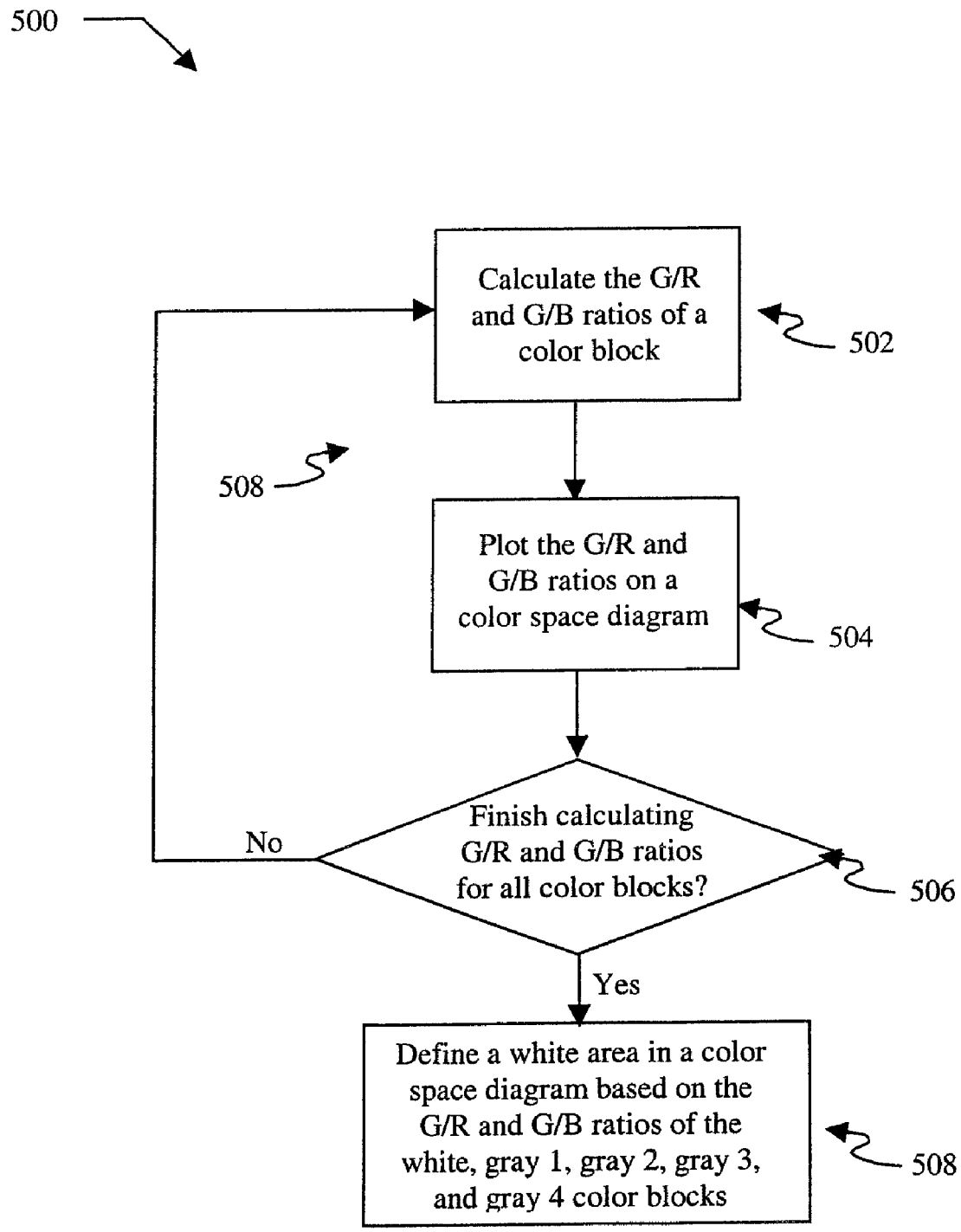
FIG. 5 is a flow diagram of a method for predefining white areas in a color space diagram in accordance with the present invention.

FIG. 5 illustrates method 500 for predefining white areas in a color space diagram. Defining a white area for a target illuminant type in a color space diagram requires analyzing a color chart under that illuminant type. For example, to define a white area for daylight involves analyzing a color chart under daylight. Defining a white area in a color space diagram begins with step 502, calculating a G/R ratio and a G/B ratio for a color block under the target illuminant source (e.g., daylight, CWF, A, U30, etc.). Next, step 504 plots the G/R and G/B ratios of the color block on a color space diagram. Then, steps 502 and 504 are repeated for all color blocks in the color chart. Step 508 identifies the area defined by the G/R and G/B ratios of the white, gray 1, gray 2, gray 3, and gray 4 color blocks in the color space diagram. This area is the predefined white area of the target illuminant source. Steps 502 to 508 are repeated for each illuminant source needed in a color space diagram.

This methodology is advantageous as this technique eliminates any influence from strong colors. Additionally, this technique can quickly detect illuminant source change in an image and respond quickly to the change by moving to a color gain setting that fits the illuminant source. While under normal condition when the illuminant source is unchanged, determination of the color gain adjustment could be performed less quickly based on the average values of the white pixels in a selected white area. This robust technique supports rapid response to illuminant source change as well as provides stability in normal operating condition.

While the preferred embodiment of the invention has been illustrated and described, it will be appreciated that various changes can be made therein without departing from the spirit and scope of the invention.

The invention claimed is:

1. A method of identifying an illuminant source of a captured image for automatic white balance comprising:
  (a) calculating a G/R ratio and a G/B ratio for a pixel of said captured image;
  (b) plotting said G/R ratio and said G/B ratio in a color space diagram;
  (c) determining a predefined white area of said color space diagram having a highest number of said pixels, which is indicative of said illuminant source of said captured image; and
  (d) determining a gain adjustment by a color processing circuit based on step (a) through step (c), respectively.

2. The method of claim 1, wherein said pixels are white pixels.

\* \* \* \* \*